Sept. 2, 1969    R. D. PAPOUSEK    3,464,688
TENSION AND EQUALIZER SPRING FOR VEHICLES
Filed April 3, 1967
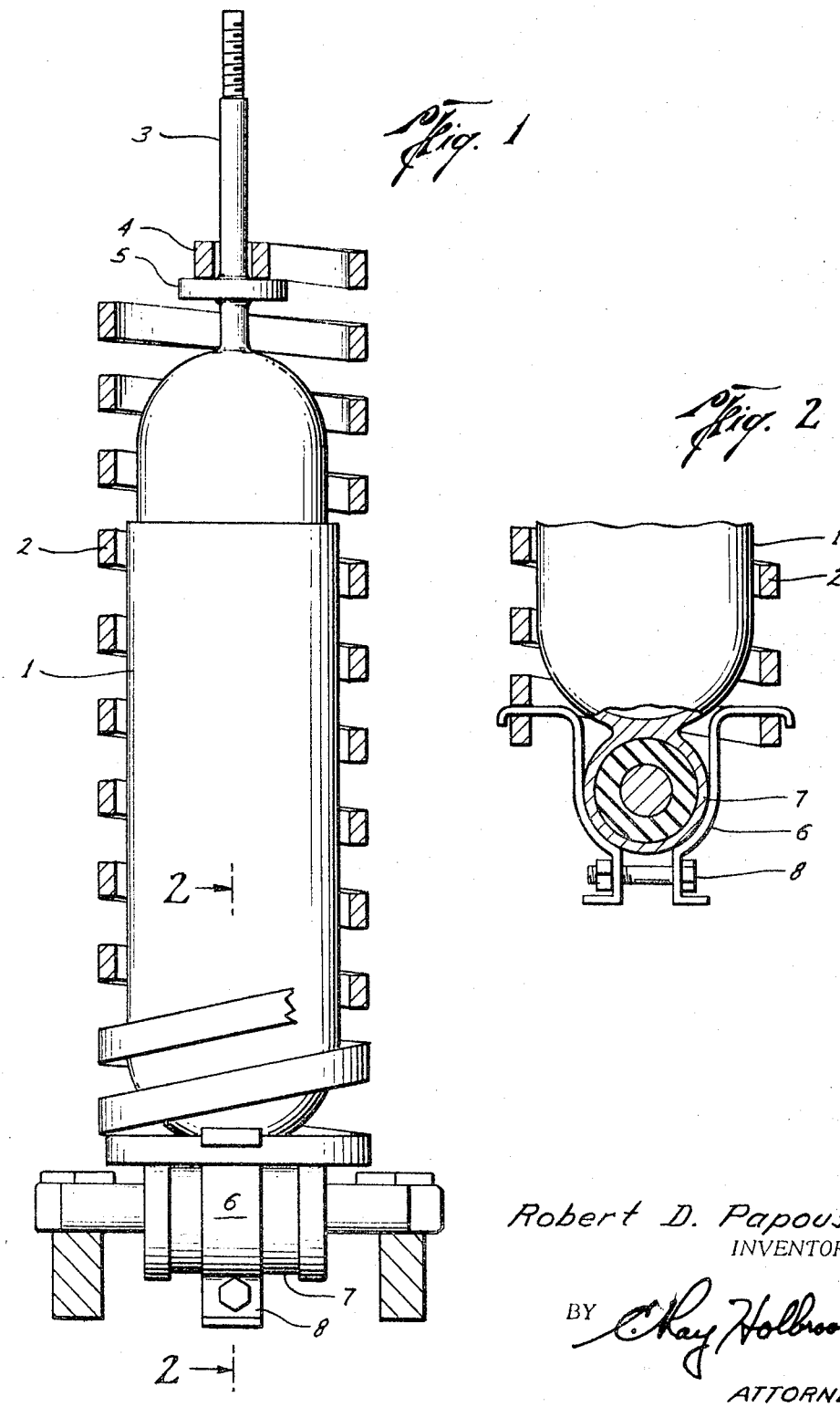
Robert D. Papousek
INVENTOR.
BY *Ray Holbrook Jr.*
ATTORNEY

United States Patent Office 3,464,688
Patented Sept. 2, 1969

3,464,688
TENSION AND EQUALIZER SPRING FOR VEHICLES
Robert D. Papousek, 3233 E. 3rd St., Tucson, Ariz. 85716
Filed Apr. 3, 1967, Ser. No. 627,892
Int. Cl. B60g *11/58*; F16f *13/00*
U.S. Cl. 267—34               2 Claims

ABSTRACT OF THE DISCLOSURE

An overload coil spring employed and installed in combination with a shock absorber on the front suspension system of a motor vehicle carrying a heavy rear load, said coil spring being firmly fastened at the top and bottom portions thereof to the frame and the wheel support respectively of the vehicle and to the plunger and the bottom support respectively of the shock absorber so the coil spring operates in tension as well as in compression.

---

This invention relates to a tension and equalizer spring for motor vehicles and more specifically it is concerned with a spring to be used on either the front or back of motor vehicles to act in tension as well as in compression.

Many suspension units for vehicles comprise a telescopic hydraulic shock absorber for heavy loads. In circumstances where a vehicle suspension already incorporating telescopic shock absorbers proves unsatisfactory in use because it is too soft for the load conditions which it experiences, then combined suspension units of the foregoing type are useful in enabling the vehicle suspension to be stiffened or otherwise modified without major structural changes, simply by directly adding a coil spring, sometimes called an overload spring, around the shock absorber to act in compression. This is frequently employed on pick-up trucks used for heavy loads or for campers installed on pick-up trucks. Frequently this so-called overload spring is used on autos or station wagons for supporting trailers or heavy loads on the back, for instance, a new type camper designed to be carried on a station wagon. In nearly all cases the compression overload springs are installed on the rear shock absorbers to support the heavy rear load.

The purpose of all auto and vehicle suspension systems between the wheels and frame of the vehicle is to support the vehicle body and frame upon the wheels and provide the means of absorbing road shock caused by passage of the wheels over irregularities. Generally speaking there are four types of springs used for such suspension. They are leaf springs, coil springs, torsion bar springs and air or liquid springs. The weight of the vehicle applies an initial compression to the springs and when the wheels encounter road irregularities, the springs further compress to absorb most of the shock. The springs may, of course, also compress due to heavy loading of the vehicle or due to banking while negotiating turns at high speed. Shock absorbers are used as noted above in conjunction with or as a replacement for springs to restrain excessive spring movement and prevent prolonged oscillations, thereby affording a rough ride. The most serious problem however with all of the various types of suspension systems for vehicles either a spring of the type mentioned above or a combination of spring and shock absorber for heavy loads is that the front, in particular, on the vehicle always rides much too high and has a definite tendency to bounce when riding over road irregularities thereby causing an uncomfortable ride and resulting in poor control of the vehicle.

It has now been discovered that by simply designing an overload coil spring to be employed and installed in conjunction with a shock absorber on the front suspension of a vehicle carrying a heavy rear load, the vehicle will ride smoothly and evenly, there will be very little bounce on road irregularities, and perfect control of the vehicle is assured. It is necessary however for the coil spring used in accordance with this invention to be firmly fastened at the top and bottom portions thereof so that it operates in tension as well as in compression.

The principal object therefore of the present invention is to provide an improved suspension system for vehicles which operates in tension as well as compression thereby holding down the front of a heavily rear loaded vehicle. These and other objects of the invention will become apparent from the following description, drawing, and appended claims.

According to the present invention, suspension system for vehicles which supports in tension the front of a rear loaded vehicle is provided by connecting a coil spring to the wheels and frame of a vehicle, preferably in conjunction with an existing shock absorber, to operate in tension as well as compression.

FIGURE 1 is a cut-away view of the apparatus of this invention showing the internals of the apparatus with the coil spring fastened at both the top and bottom in conjunction with an existing shock absorber normally installed on vehicles.

FIGURE 2 is a detail view of the bottom arrangement of the coil spring fastened to the frame support of the shock absorber.

Referring now to FIGURE 1, the apparatus is comprised of shock absorber body 1 with coil spring 2 installed around said shock absorber and fastened thereto. Rod 3 of said shock absorber has attached thereto the top portion or pigtail 4 of the coil spring and is attached to rod 3 above collar 5 of said shock absorber 1 so that as rod 3 of said shock absorber 1 is pulled out of the cylinder of said shock 1, coil spring 2 will be pulled in tension by collar 5. The bottom portion of said coil spring 2 is clamped to the bottom frame or mounting sleeve 7 of said shock absorber 1 by clamp 6 and bolt 8 to provide firm and stable anchoring of the bottom of coil spring 2 so that as rod 3 of shock absorber 1 is pulled upward by the wheel of a vehicle passing over a road irregularity, coil spring 2 will pull in tension and tend to pull rod 3 downward thereby dampening the effect of road irregularities on the front suspension system of a rear loaded vehicle.

Referring now to FIGURE 2, coil spring 2 is shown in section wrapped around shock absorber 1. The detail of the bottom clamping of coil spring 2 to the ring and sleeve 7 of shock absorber is illustrated with clamp 6 holding down the bottom ring of coil spring 2 by clamping around mounting sleeve 7 and fastening by means of bolt 8.

It will be apparent to those skilled in the art that the illustrated apparatus is a considerable improvement over the suspension systems used presently for heavily rear loaded vehicles such as pick-up trucks and station wagons carrying campers, trailers or other heavy loads. For instance, the present apparatus is extremely simple in construction, having only a top pigtail 4 and a clamping system 6 and 8 as modifications of an ordinary coil spring used on vehicles as overload springs in conjunction with a shock absorber. In addition the apparatus is easily installed in a few minutes to the front shock absorber arrangement on most vehicles and is maintenance free and substantially undamageable. The key inventive feature is that the coil spring employed must be securely fastened at both the top and bottom of an operating shock absorber so that when road irregularities cause the rod of a shock absorber to operate in and out, the tension characteristic of the coil spring will dampen the bouncing effect of the front of a rear loaded vehicle.

The apparatus of this invention can be constructed of any metal or alloy of sufficient strength to withstand continuous spring action of a coil spring working in both compression and tension between the frame and wheel of a vehicle. Examples of satisfactory material of construction are carbon steel, stainless steel and steel alloys ordinarily used in coil springs or aluminium, bronze, brass or alloys of the same used in coil spring construction.

The size of the coil spring used in the construction of the apparatus of the present invention depends on the size of the shock absorber employed in conjunction with the coil spring and the size and weight of the vehicle and its load.

I claim:

1. A vehicle suspension system for reducing the bouncing of the front of a rear loaded motor vehicle comprising a coil spring installed around a shock absorber connected to the frame and wheel support of said vehicle, said coil spring being connected at the top portion thereof to the frame of said vehicle and is fastened securely around the plunger of said shock absorber so that the top portion of said coil spring extends as the plunger rod of said shock absorber is withdrawn from the body of said shock absorber and at the bottom portion thereof said coil spring is fastened securely to the bottom support of said shock absorber and said wheel support, said connections being immovable during use of said coil spring so that said coil spring operates in tension.

2. The apparatus of claim 1 wherein the said coil spring is connected to each of the front wheel systems of said vehicle.

References Cited

UNITED STATES PATENTS 2,969,974   1/1961   Pemberton    267—23
3,212,768   10/1965   Casimir    267—34

DRAYTON E. HOFFMAN, Primary Examiner

U.S. Cl. X.R.

267—1, 61, 69